United States Patent
Freifeld

(10) Patent No.: US 6,724,489 B2
(45) Date of Patent: Apr. 20, 2004

(54) THREE DIMENSIONAL SCANNING CAMERA

(76) Inventor: Daniel Freifeld, 2960 Redwood Rd., Napa, CA (US) 94558

(*) Notice: Subject to any disclaimer, the term of this patent is extended or adjusted under 35 U.S.C. 154(b) by 0 days.

(21) Appl. No.: 09/957,739

(22) Filed: Sep. 21, 2001

(65) Prior Publication Data

US 2002/0054299 A1 May 9, 2002

Related U.S. Application Data

(60) Provisional application No. 60/234,487, filed on Sep. 22, 2000.

(51) Int. Cl.[7] ............................................. G01B 11/24
(52) U.S. Cl. ...................... 356/601; 356/614; 356/394; 356/237.4
(58) Field of Search ................................. 356/601, 602, 356/603, 604, 605, 606–608, 612, 614, 622, 623

(56) References Cited

U.S. PATENT DOCUMENTS

| 4,585,349 | A |   | 4/1986  | Gross et al. ................. 356/375 |
| 4,844,617 | A |   | 7/1989  | Kelderman et al. .......... 356/372 |
| 5,177,556 | A | * | 1/1993  | Rioux .......................... 356/73 |
| 5,608,529 | A |   | 3/1997  | Hori |
| 5,629,773 | A |   | 5/1997  | Wakai et al. |
| 5,636,023 | A |   | 6/1997  | Yanagisawa |
| 5,646,733 | A |   | 7/1997  | Bieman |
| 5,815,275 | A |   | 9/1998  | Svetkoff et al. |
| 5,825,666 | A |   | 10/1998 | Freifeld |
| 5,850,289 | A | * | 12/1998 | Fowler et al. ............... 356/603 |
| 6,134,013 | A |   | 10/2000 | Sirat et al. |
| 6,144,453 | A |   | 11/2000 | Hallerman et al. |
| 6,160,910 | A |   | 12/2000 | Freifeld |
| 6,271,963 | B1 |  | 8/2001  | Freifeld |

OTHER PUBLICATIONS

*Notification of Transmittal of The International Search Report* dated Mar. 14, 2003.

* cited by examiner

*Primary Examiner*—Hoa Q. Pham
(74) *Attorney, Agent, or Firm*—Wiggin & Dana LLP; Gregory S. Rosenblatt

(57) ABSTRACT

A system for measuring the spatial dimensions of a three-dimensional object employs a lens and at least two detectors. The combination of which defines two or more object planes. The combination of the lens and the detectors define an optical axis that is normal to the object planes and passes through a focal point of the lens. At least a first and a second photodetector are optically aligned with the object through the lens. The first and second photodetectors or array of detectors are further parallel with the surface but have differing elevations relative to that surface. In addition, the first and second photodetectors are capable of motion relative to said object. Electrical output from the first and from the second photodetectors is provided to a processor that determines a distance of the object from the lens and thereby a height of the object. This system is particularly suited for measuring the spatial dimensions of solder balls mounted to a surface of a ball grid array (BGA) electronic package.

18 Claims, 7 Drawing Sheets

THREE DIMENSIONAL SCANNING CAMERA

CROSS REFERENCE TO RELATED PATENT APPLICATION

This patent application claims priority to U.S. provisional patent application Ser. No. 60/234,487, entitled "Three Dimensional Scanning Camera," that was filed on Sep. 22, 2000.

BACKGROUND OF THE INVENTION

1. Field of the Invention

This invention relates to an optical system for determining the spatial dimensions of an object. More particularly, a sensor is angled relative to an image plane of the optical system. Various areas of the sensor in the image plane focus to a slightly different elevation. Electronic processing is employed to determine which linear scan is most in best focus. From the best focus data, both the height of the object relative to a base surface and the coplanarity of the object relative to other objects may be rapidly determined.

2. Description of the Related Art

Semiconductor packages intended to encapsulate one or more semiconductor microelectronic devices include a feature to transmit electrical signals from external sources to the devices. While leadframes are widely used to transmit the electrical signals, the leadframe extends beyond the semiconductor package periphery extending the area on a printed circuit board required to support that device. As space is often a consideration, leadless semiconductor packages have been developed. One such leadless semiconductor package is referred to as a ball grid array (BGA) package.

In a BGA package, solder balls are mounted to bond pads formed on either the semiconductor base or cover. Conductive vias extend from the bond pads to electrically conductive sites in the semiconductor package interior. The electrically conductive sites are electrically interconnected to the one or more microelectronic devices such as through small diameter bond wires. The resulting structure provides electrical continuity from the microelectronic device to the solder balls.

When the semiconductor package is to be joined to a printed circuit board, the package and board are heated to a temperature sufficient to melt the solder balls that then fuse with bond pads formed on a surface of the printed circuit board. The solder balls are relatively small, on the order of 0.040 inch in diameter, and closely spaced one from another with a typical solder ball to solder ball pitch being 0.080 inch.

During the fusing step, adjacent solder balls must not contact one another or a short circuit will form. In addition, each solder ball must contact a matching bond pad on the printed circuit board or an open circuit will form. To prevent these defects, both the solder ball size (solder volume) and solder ball coplanarity (solder ball diameter) must be tightly controlled.

There are a number of optical systems presently available to measure solder balls in a BGA package as a quality control function prior to sing. These systems typically require a significant amount of time to evaluate each solder ball, on the order of up to 1 second per BGA package. Manufacturers seek a method to characterize the solder balls while reducing the inspection time.

Among the solder ball inspection systems presently utilized are systems that determine BGA characteristics based on comparing the views of two separate video cameras. Just as human eyes perceive depth based on the slight physical offset between the eyes, these systems utilize the same parallax concept to determine the height of each bump by comparing the differences between the two views of each camera. The manufacturers claim accuracy of 10 to 12 microns for coplanarity and diameter of each ball with an inspection throughput of 0.250 to 1 second per part. The part must come to a stop in front of the inspection cameras during use.

Another inspection system utilizes Fast Moiré Interferometry. A dense pattern of light and dark areas are projected onto the solder balls while a video camera images the subject. The pattern is physically shifted slightly and the video camera acquires a second image of the part. This may be done once or multiple times and the various views are recorded by the system. If the pattern is fairly ordered, say a series of rectangles, as they fall across the spherical shapes of the solder balls, the system can determine the position and form of the balls. Shifting the projected pattern a given amount and reviving the changes in the image enable the system to determine ball height and ultimately coplanarity. This system is claimed by the manufacturer to be slightly faster and more accurate than systems based on the parallax concept.

Still another measuring system determines the three dimensional form of objects, such as solder bumps, by projecting a thin line of laser light on a part. A video camera takes an image of the line of laser light. For a flat object, the image of the laser line is simply a line. If solder bumps are introduced, the laser line will appear to have curves proportional to the size of the bumps. The speed of this system is limited by the acquisition speed of the video camera.

Other methods for bump height measurement currently employed are microscope auto-focus and laser point triangulation. These methods are significantly slower than those discussed above and are not believed used for in-line 100% package inspection.

U.S. Pat. No. 6,134,013, to Sirat et al., discloses a method and apparatus for inspecting a three dimensional structure such as an electronic component, using collimated light for accurately measuring the three-dimensional structure of members protruding above the surface of the component. Collimated light illuminates the surface and a spherical or other three-dimensional structure on the surface is analyzed using stereoscopic, holographic, moiré, or conoscopic analysis of light reflected or scattered by the structure, using an array of optical detectors in a detector plane.

U.S. Pat. No. 6,144,453, to Hallerman et al., discloses a three-dimensional inspection system used to obtain three-dimensional information pertaining to an article having specular surfaces, such as a BGA device, by projecting a pattern of light onto the article at an oblique angle with respect to the article. The system includes a patterned light projector having an optical axis disposed at an oblique angle with respect to the plane of the article being inspected and an image detector or camera disposed generally above the article being inspected to detect the image of the pattern projected on the article. The pattered light projector includes an extended light source that directs light along the optical axis and a light patterning member disposed at an angle with respect to the optical axis such that the light pattern is in focus in an image plane parallel to the plane of the article, thereby satisfying the Scheimpflug condition (to avoid distortion, film plane, subject plane and lens plane converge along a single line). The light pattern preferably includes lines of light projected onto the article with substantially equal thickness and spacing. The spacing of the lines is preferably greater than a spacing or pitch of the specular elements. An image processor is coupled to the image detector to receive the image, locate the lines, and measure the lateral shift of the lines. Height information is determined from the lateral shift and projection angle using triangulation.

Both the U.S. Pat. No. 6,134,013 and the U.S. Pat. No. 6,144,453 is incorporated by reference herein in their entireties.

U.S. Pat. No. 6,160,910 to Freifeld discloses a high precision camera effective to capture a video image of an object with enough precision such that information derived form the video image is sufficient to provide accurate measurements of the object for quality control and other applications. A positional encoding technique that is highly insensitive to transient and steady state mechanical tolerances in the mechanical scanning system is employed. The U.S. Pat. No. 6,160,910 is incorporated by reference herein in its entirely.

While the above-noted methods have served the industry well, there remains room for improvement. The parallax and moire systems require the part to stop in front of the camera for at least 0.2 seconds. Ideally the industry would like a sensor where the part would not have to stop at all. In addition, these methods do not provide a full 360-degree height representation of the ball but instead characterize the surface at the tops of the ball and a portion of one side.

SUMMARY OF THE INVENTION

Accordingly, it is an object of the invention to provide an inspection system to characterize the height and surface form of a three dimensional object. Another object of the invention is that the inspection is essentially dynamic, that is he pard is not stopped in front of a camera during inspection, or if stopped, the stop time is minimal.

It is a feature of the invention that, in one embodiment, the inspection system utilizes a plurality of detectors positioned at different heights in the optical axis near the image plane of a lens. A computer system receives data from each detector and determines the distance between the object and the lens based on a contrast comparison of a pixel and its neighbors at various heights; it is recognized that where the contrast is at a maximum the object is typically in best focus.

It is an advantage of the system of the invention that three-dimensional objects, such as solder bumps projecting from a semiconductor package, are measured more accurately, more completely and faster than by current techniques. A further advantage of this invention is that the inspection system does not require a pat to stop in front of the inspection camera, but merely to pass by it while in motion.

In accordance with a first embodiment of the invention, there is provided a system for measuring the spatial dimensions of a three-dimensional object that employs a lens and sensor. This sensor is made up of at least two detectors. The combination of the lens and sensor defines an optical axis that is normal to the object planes and passes through a focal point of the lens. At least a first and a second photodetector or an assay of detectors are optically aligned with the object through the lens. The first and second photodetectors or array of detectors are further parallel with the object planes but have differing elevations relative to the object planes. In addition, the first and second photodetectors are capable of motion relative to the object. Electrical outputs from the first and from the second photodetectors are provided to a processor that determines a distance of the object from the lens and thereby a height of the object. It is a fiber advantage of the invention that X, Y, and Z coordinate information and gray scale information is transmitted to the processor at the same time.

In accordance with a second embodiment of the invention, a pattern of light and dark features is projected on an object This projection causes the objects to appear grainy which is an aid to focusing algorithms. A further enhancement can be achieved through the projection of a grid of light and dark areas using a back illuminated reticle.

In accordance with a third embodiment of the invention, chromatic aberration is introduced into the projecting lens.

The above stated objects, features and advantages will become more apparent from the specification and drawings that follow.

DETAILED DESCRIPTION

While the measurement system of the invention is being described in terms of solder balls on a BGA package, the measurement system is equally suitable for measuring the height and shape of other three dimensional objects. Accordingly, the invention is not intended to be limited to the measurement of BGA solder balls.

Figure 1:
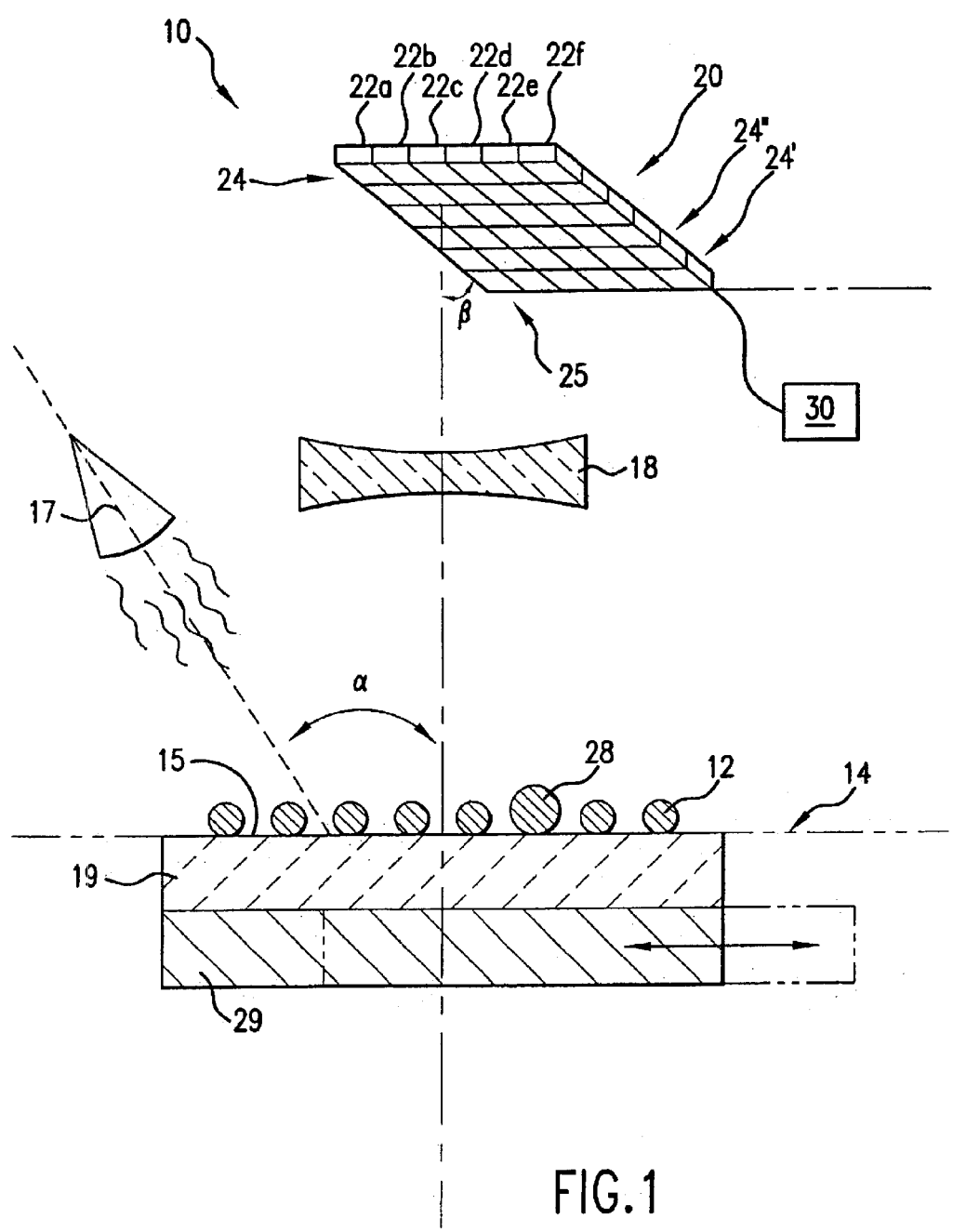
FIG. 1 is a schematic representation of an embodiment of the invention for measuring the spatial dimensions of an object.

FIG. 1 schematically illustrates a system 10 for measuring the spatial properties, such as size and diameter, of a three-dimensional object 12 projecting from an object plane 14. In FIG. 1, the object 12 is a solder ball and the object plane 14 is a surface 15 of a substrate 19, such as a microelectronic package. Although, other objects mounted on any surface may be measured. Object plane 14 and objects 12 are illuminated by any suitable light source 17, such as a fiber optic panel or a fluorescent light source. Preferably, the light source is at an angle, $\alpha$, of from 10° to 170° relative to an optical axis 16 and provides appropriate illumination.

The object plane 14 is positioned substantially normal (perpendicular (90°±1°)) to the optical axis 16 which is defined by a combination of lens 18 and a sensor 20. As described below, there is relative motion between the object plane 14 and the sensor 20. The lens 18 is any high quality optical lens having a fairly shallow depth of field. This depth of field will directly influence the depth measurement resolution of this invention. A lens with a numerical aperture of 0.4 will give a depth of field of about 6 microns, as depth of field is generally proportional to the inverse of the square of the numerical aperture. The numerical aperture is defined as sine ½ lens viewing angle. By utilizing a high numerical aperture lens, the system optics have a very shallow depth of field. As a result, when the, system is focused on one object, other objects that are slightly higher or lower will appear out of focus. Preferably, the numerical aperture is at least 0.1.

Sensor 20 contains at least two detectors 22. An exemplary sensor, as illustrated in FIG. 1 has 36 detectors. Each row of detectors 22a . . . 22f is aligned along a linear array line 24. Preferably, there are in the range of 50 to 100 or more linear array lines arranged in a rectangular array. Each linear array is formed from a plurality of detectors, preferably photodetector pixels. In one embodiment a CCD array can be used that is not a square grid. While the number Of detectors 22 per linear array line 24 may vary, the larger the number of detectors, the better the resolution. Preferably the number of detectors per linear array may be above 1024, with 4096 being an exemplary choice.

When a detector is irradiated with light reflected from the objects 12, the detector receives the light and generates an electrical signal which is converted by image processing electronics to a gray-scale value that is typically between 0 and 255 for an eight bit digital encoding.

The sensor 20 is positioned so that each line array line 24 is parallel to the object plane 14, but with the rectangular array forming an array plane with an angle, β, relative to the optical axis so that the distance between each linear array line 24, 24', 24" and the lens 18 is different This angle, β, may be any between 1° and 89° and is preferably between 30° and 60° and most preferably is approximately 45°. The system I0 is designed to insure that each linear array line 24, 24' 24" has an unobstructed view of the objects 12 through the lens 18. Further, the sensor 20 is positioned near the optical image plane of the leas so that objects 12 will be in focus for at least one of the detectors 22a . . . 22f on the linear array line 24.

The sensor 20 with linear array lines 24, 24', 24" is not placed flat in the image plane of the optics. Instead it is placed at a tilt such that each of the detector linear array lines is at a different image plane position, One line of detectors e.g. 24", preferably the central line of detectors, is at the nominal image plane location, so that approximately half the lines are positioned in front of the nominal image plane and half the lines are correspondingly behind the nominal image plane. The farther any particular line is from the central line, the further away it will be from the nominal image plane position.

In a preferred embodiment, the sensor 20 is formed from a series of linear arrays of pixel detectors with each linear array functioning as an individual line scan camera, such as those manufactured by Dalsa of Waterloo, Canada. A series of linear array cameras is preferred due to faster image collection speed and higher resolution when compared to area cameras that are employed in prior art methods described above. In accordance with the invention, a series of linear array detectors acquires images that contain depth measurements for each pixel of the visual image.

This invention makes use of the fact that the optical system 10 has a low f/# and correspondingly have a very shallow depth of field. Rather than have a single line of detectors, sensor 20 uses many adjacent lines for example 100 lines, each scanning an image of a moving part. As in a time delay and integrate (TDI) line scan camera such as those made by Dalsa, an encoder signal trigger synchronizes the successive reads of each line so that the same area of the part is under each successive line when the trigger signal is applied. The trigger signal can be driven by motion of either the object, the sensor, or a stage. Alteratively, the trigger signal can be driven by an independent clock that controls linear array image capture timing and simultaneously directs the motion control electronics to drive the scanning mechanism at the appropriate speed for synchronized scanning.

Each linear array of pixels within the sensor can be thought of as creating its own independent image. If such a tilted sensor is coupled with a low f/# lens then each of the linear array lines in the image space of the lens 18 will have a corresponding position of best focus in object space. If such an arrangement was used to scan a flat object, and a separate scan of this object was acquired by each of the linear array lines. One of the resultant images would appear to be in best focus and sharpest. As the f/# of the optical system is reduced, the difference between the image in best focus and the other ones will be more evident in gray-scale using autofocus techniques. Gray-scale focusing techniques are well known in the machine vision industry. These techniques make use of the fact that when an image is in best focus there will generally be a higher degree of contrast between adjacent pixels then when the image is out of focus.

If a number of objects 12 are placed in an array and then moved relative to the detectors and scanned by system 10, and if all the objects are of the same height the tops of all objects will all appear to be in best focus in one of the image planes. If an object 28 had a different height than the other objects 12, object 28 would appear to be in best focus in a different image plane that was created by a correspondingly different line. The distance this line is from the line that produced best focus for the other objects corresponds to a physical distance presenting the height differential.

Interpolation techniques enable the system 10 to determine an object height corresponding to best focus to within some fraction of the distance along the optical axis between each row of linear arrays. A reasonable value to achieve might be ⅕ of a linear array line. This would give a system with 100 linear array lines an accuracy equivalent to 1 part in 500. For a scan range of 500 microns, the system would have an accuracy of 1 micron, significantly improving over the current 10 micron accuracy of most systems.

Running at high line rates, sensor 20 generates a huge amount of data and could possibly overwhelm an associated processor. The time required to process all the data could impair the system throughput. To enhance throughput, the system 10 may include a dedicated electronic processing module 30 to reduce the volume of data being transferred to a host computer for final analysis.

Figure 2:
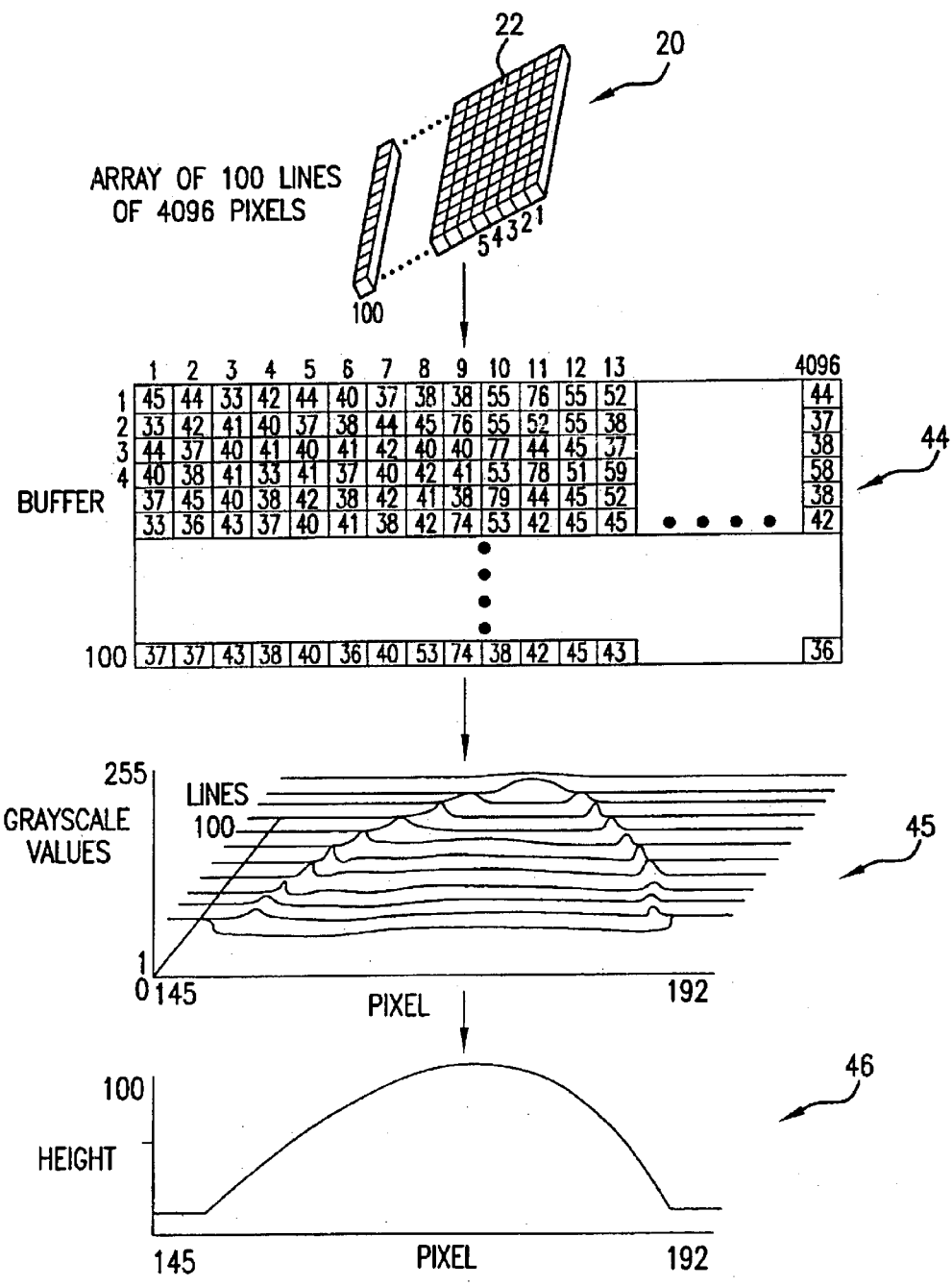
FIG. 2 illustrates the use of a buffer to manage data generated by a plurality of detectors used in making spatial measurements in accordance with an embodiment of the invention.

FIG. 2 illustrates the use of a buffer to manage the numerical values generated by each detector 22 of sensor 20 that are converted to gray-scale values to determine the height of an object. An exemplary array of 100 linear arrays with 4096 detectors (the detectors are also referred to as pixels) generates a numerical value for each detector 22. The numerical values are electronically transferred to a buffer 44 and the numerical values converted to gray-scale values 45 of from 0 to 255 that can be converted to a height measurement 46.

Similar to a TDI camera where each pixel in adjacent lines is synchronized in time to look at the same section of the part as it moves under the camera, the present invention will collect say 100 linear array line values, each at a different height, one from each of the adjacent lines and send them to a buffer. The buffer will feed an analysis algorithm realized on an integrated circuit that will from these 100 values choose the ideal focus position for that pixel.

With reference back to FIG. 1, data from the processing module 30 may be utilized in any effective form. In a first embodiment, for each pixel 22 in the scanned image the electronic processing module 30 can return a value identifying the line 24, 24', 24" that gave best focus. For greater accuracy, the processing module 30 can return a value that is interpolated to a greater degree of accuracy to be between values identified by two adjacent lines. This best focus value can be calibrated to an actual height on the part. In a second embodiment, at the point of best focus the actual gray scale value of that line can be returned to create a large format video image. If a linear array of length 4096 pixels is used, the system will be able to return a picture with four times greater resolution and accuracy than can be obtained from a 1024×1024 area camera for measurements such as ball diameter and placement.

Scanning of the linear array lines 24 across the objects 12, 28 may be by any effective means. For example, either the objects 12 or the sensor 20 may be physically moved. In one embodiment, the objects 12 supported by substrate 19 are mounted on a stage 29 that provides translational movement. Alteratively, a mirror may be used to scan an image of the objects 12 across the linear array lines 24 without actual physical motion.

Physical motion may be obtained by use of the translation stage 29 with at least one axis of motion orthogonal to the optical axis. Either the objects 12 or the sensor 20 may be mounted on the translation stage.

A clock associated with processing module 30 may be used to trigger linear array lines 24 acquisition in sync with motion of the objects 12 such that at each time interval, the same area of the object 12 that was viewed by a detector in a linear array column 25 is viewed by another detector in that same column. Alteratively, an encoder may be associated with the mechanical motion creator to trigger detector 22 acquisition in sync with motion of the objects 12 such that at each time interval, the same area of the objects 12 that was viewed by one detector is viewed by another detector in the same column.

Figure 3:
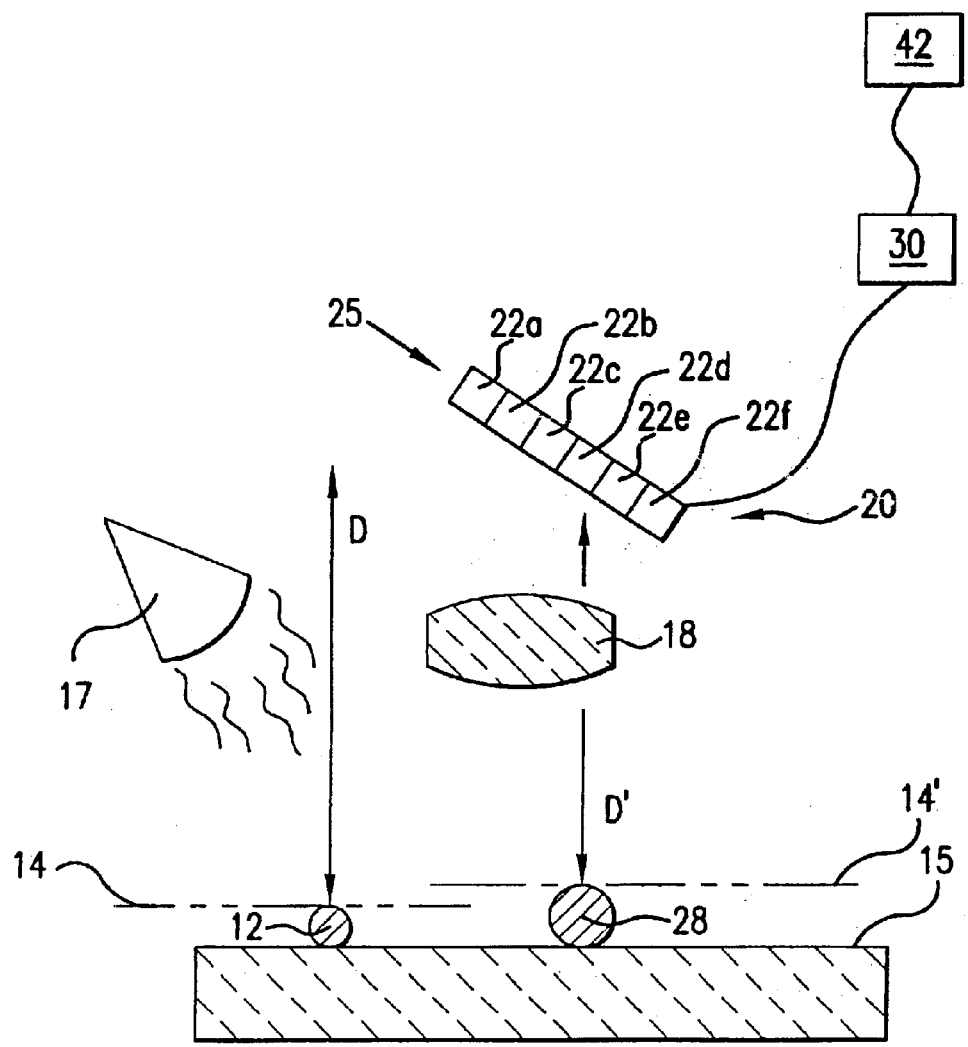
FIG. 3 schematically illustrates operation of the measurement system of the invention.

FIG. 3 schematically illustrates the operation of the measuring system of the invention. Solder balls 12 and 28 have object planes 14, 14', respectively, and are supported by a surface 15 and illuminated by light source 17. A sensor 20 has a plurality of detectors 22a . . . 22f aligned in a linear array column 25. Each detector array line images at best focus at a different height in the object plane and as would follow, at a correspondingly different distance from the surface 15. The greatest contrast will come from a top of a solder ball when it is at a point during the scan that brings it into best focus on a particular linear array. This particular away will correspond to a certain point of focus in the object space and the height of the top of the solder ball 28 can be known with respect to the height of other objects such as the substrate 15. A gray-scale value, proportional to the intensity of the reflected light is electronically transmitted to processing module 30 that considers gray-scale value and height based on contrast, then X, Y, and Z coordinate data and gray-scale data for each detector is transmitted to computer 42. Computer 42 is programmed to correspond the greatest contrast to a height and will then provide a height measurement for the solder balls. The computer will also typically manage one or more of motion control, sensor image acquisition, triggering and image analysis.

Sides of the solder balls also reflect a portion of the light back to the, detectors, although with less intensity than the top of the ball. Based on the intensity and contrast differences, the computer 42 can calculate both the diameter and shape of the solder ball. From the diameter and height, the volume of solder may be calculated.

Figure 4:
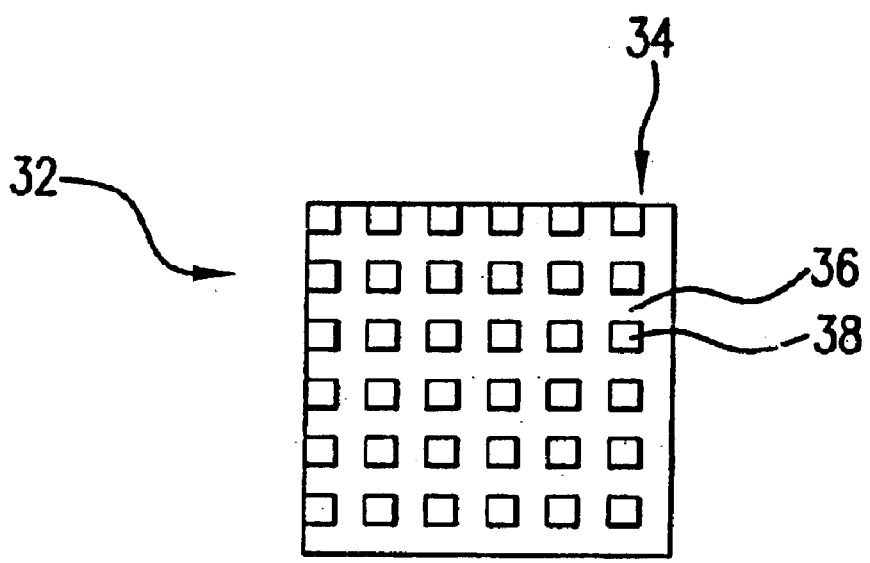
FIG. 4 illustrates a sensor in accordance with an alternative embodiment of the invention.

FIG. 4 illustrates a sensor 32 in accordance with an alternative embodiment of the invention. The linear array lines 34 are spaced at some distance apart from each other rather than immediately adjacent to each other. Likewise, a space 36 can be disposed between adjacent detector elements 38. Space 36 is a non-photoactive region. The sensor 32 can be formed either by building the sensor this way in the foundry or by placing a mask over select portions of the sensor. The effect of basically reducing the sensor detector size with respect to the sensor overall size is to increase the sensitivity of the camera. Preferably, the active area of the detectors is reduced to less than the blur spot size of the lens. Blur spot size is defined as $(0.6\lambda/N.A.)$ where $\lambda$ is defined as the wavelength of the projected light and N.A. is the numerical aperture.

As a practical example of such an arrangement, consider a 30 mm square BGA package that is imaged by a sensor consisting of 100 lines each containing 4096 square pixels at a 14×14 micron size. The magnification of such a system would be approximately 2 times. This would mean the pixel size in the field is 7×7 microns. Placing a mask reduces the size of the pixel on the sensor to say 5×5 microns and would yield a pixel in the field of view of 2.5×2.5 microns. This size pixel would be more sensitive to height measurement accuracy.

For most embodiments of the invention, the objects are illuminated with a homogeneous diffuse light, such as a Cloudy Day Illuminator (CDI) as provided by North East Robotics of New Hampshire. Alteratively, a pattern of light and dark features are projected onto the object. The size of these features is determined by the object size and the feature size is selected to be equivalent to a detector size in the field of view. The projected features cause the objects to appear grainy, an aid to focusing algorithms. A beam-splitter in the optical path can introduce such a projection.

Figure 5:
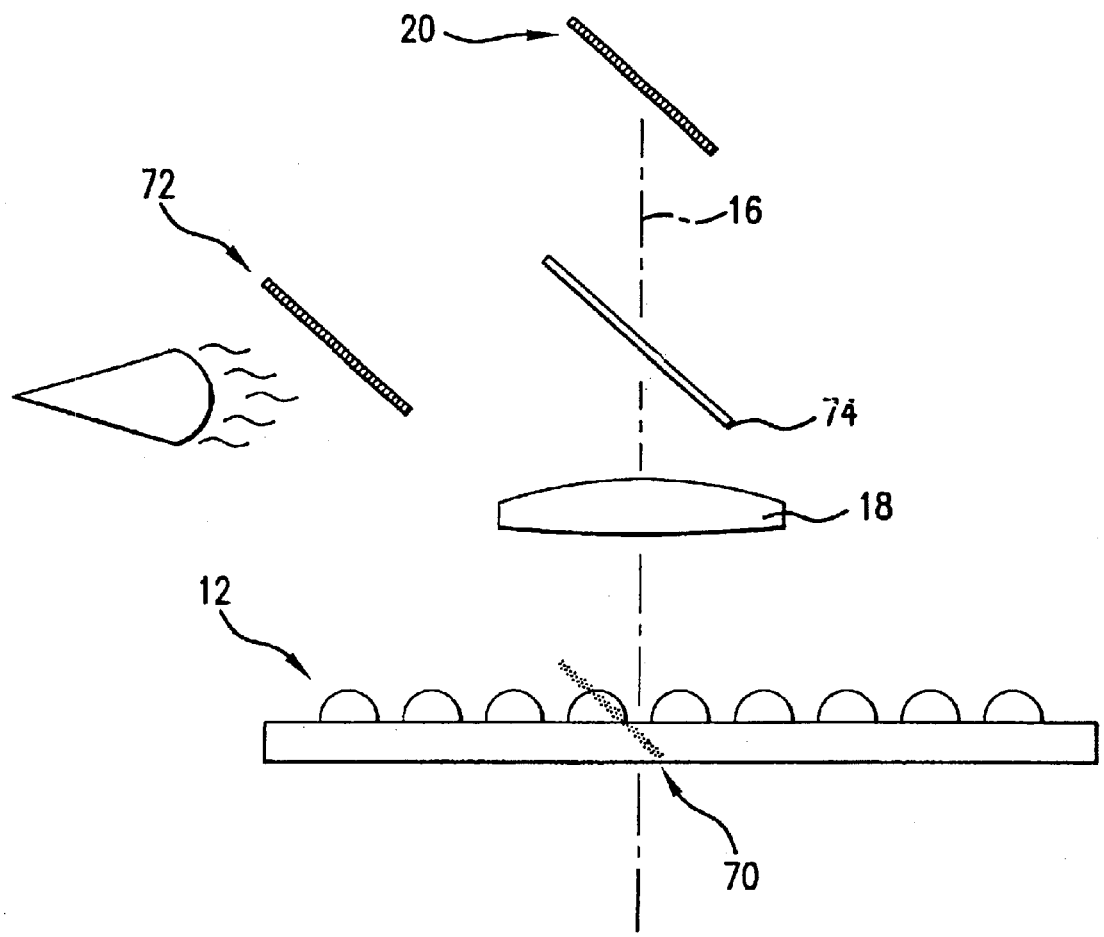
FIG. 5 illustrates projected pattern to educe resolution in accordance with an embodiment of the invention.

A further embodiment, as illustrated in FIG. 5, is to project a grid 70 of light and dark features using a back illuminated reticle 72 in combination with a beam splitter 74. The reticle is preferably disposed at the same angle relative to the optical axis 16 as is the sensor 20. The projected grid 70 of the reticle comes into focus on the object 12 in the 4same position in the field of view that the image sensor is focused.

Figure 6:
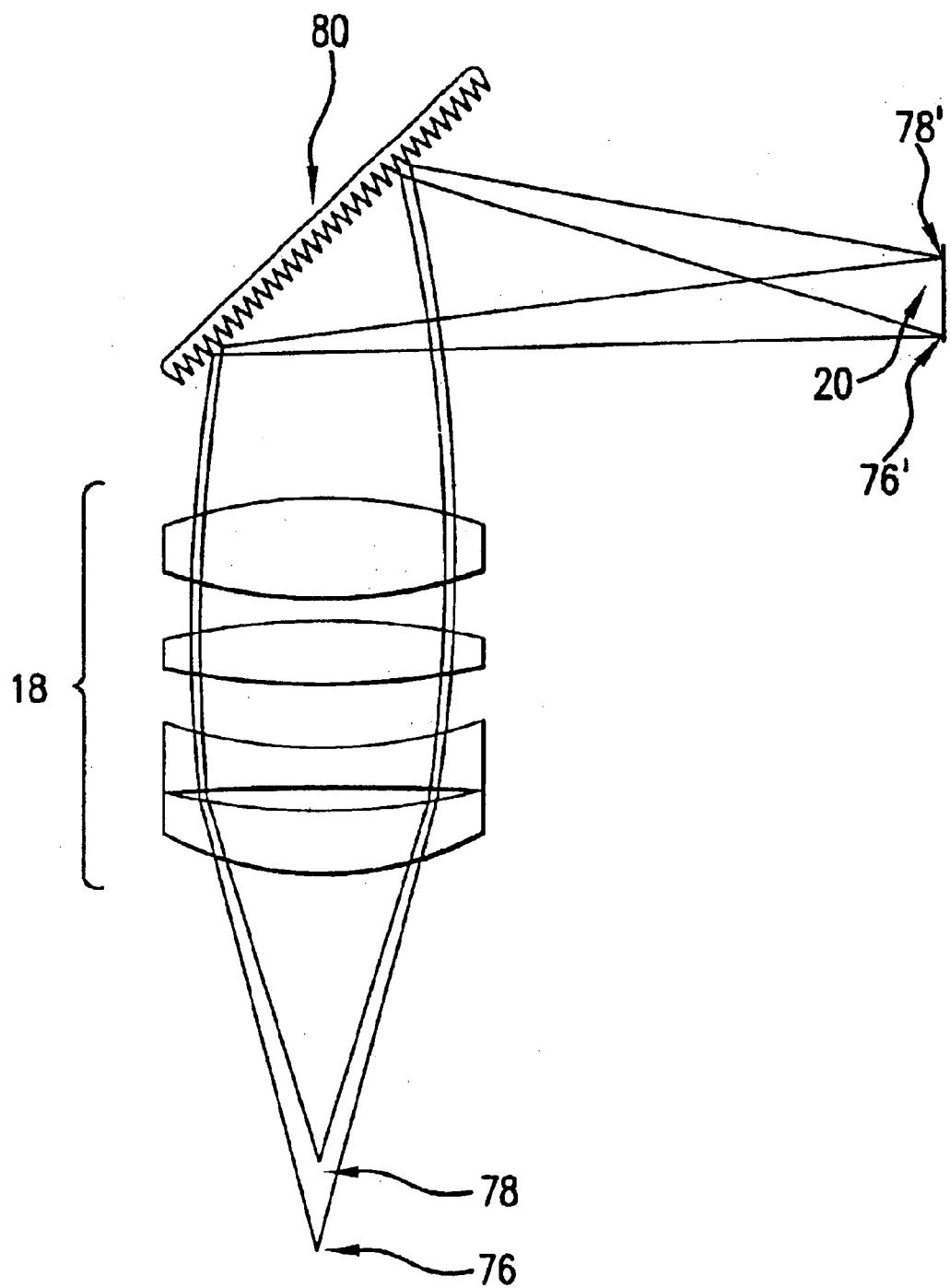
FIG. 6 illustrates the use of optical chromatic aberration of a lens to differentiate focal lengths in accordance with an embodiment of the invention.

Another alternative embodiment of this invention, as illustrated in FIG. 6, utilizes the optical chromatic aberration lens 18. All lenses show some degree of longitudinal chromatic aberration, which is when an optical system has a different focus point for red rays of light 76 compared to blue rays of light 78. While typically optical designers choose optical prescriptions to minimize this effect, in this embodiment, the lens is selected to maximize its effect.

In this embodiment, a lens 18 is selected to have a high degree of chromatic aberration. The lens and the three-dimensional object to be measured define an optical axis that is normal to an object plane of the object and passes through a focal point of said lens. A sensor having at least a first photodetector and a second photodetector is optically aligned with both the object though the lens and with a diffraction grating disposed between the lens and the sensor.

The diffraction grating 80 or prism is positioned in front of sensor 20. The diffraction grating 80 spreads the light by color across the detector array. Different colored light 76',78' will result in a different focus point on each line of the detector.

The diffraction grating separates the spectrum of light reaching the sensor such that different wavelengths of light collected from the object by the lens are then directed to different photodetectors on the sensor and furthermore because of the high degree of longitudinal chromic aberration of the lens. Different wavelengths of light come to best focus in the object plane at different distances from said lens. Electrical outputs from each photodetector is provided to a processor that determines a distance of said object from said lens and thereby a height of said object.

Figure 7:
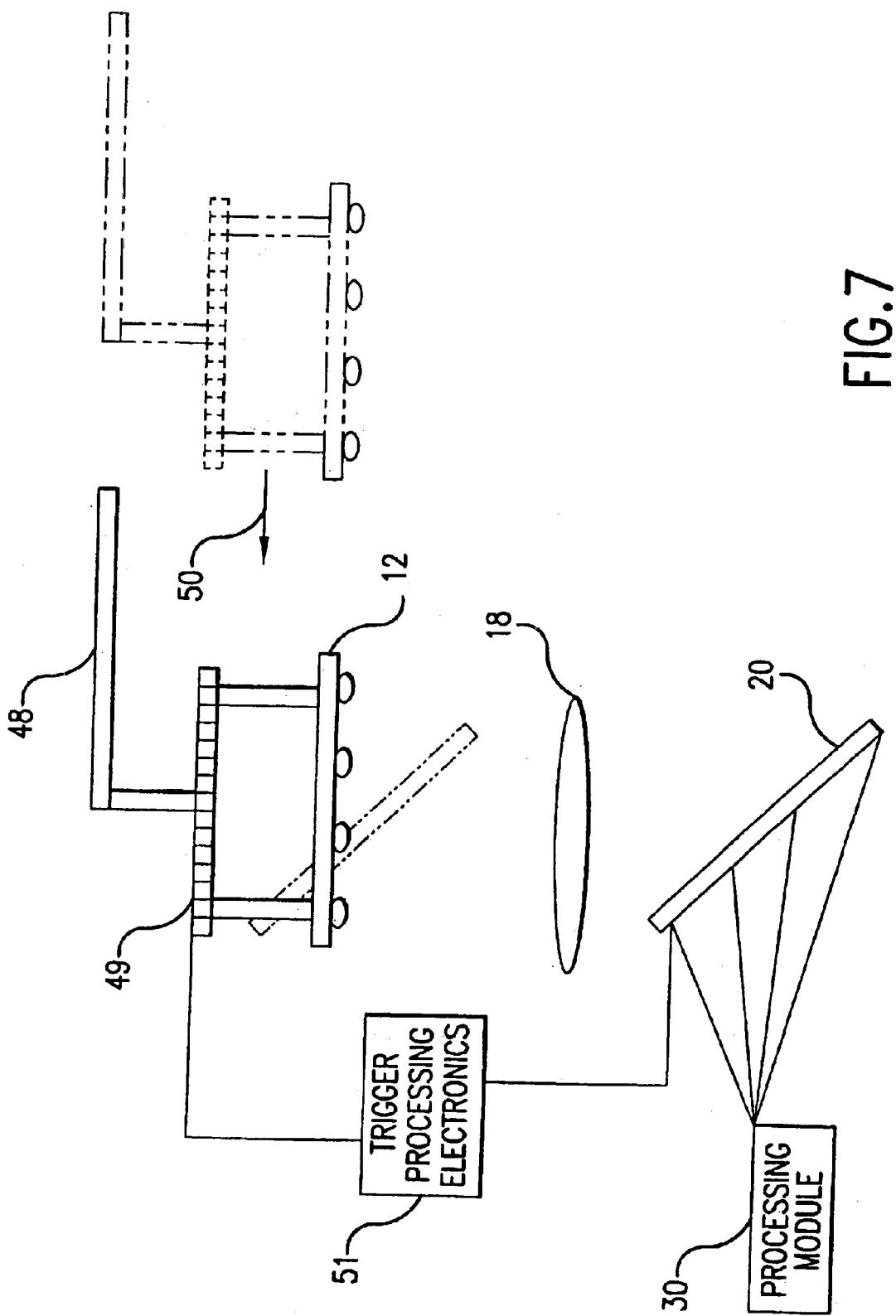
FIG. 7 illustrates an embodiment if the invention utiling a pick and place machine.

As illustrated in FIG. 7, an object, such as a ball grid array can be scanned while it is by moved by a pick and place machine. Pick and place machines, such as those made by Quad of Willow Grove, Pa. or Fuji America Corporation of Vernon Hills, Ill. are commonly used in integrated circuit manufacturing to verify conformance to quality standards. Solder ball 12 is scanned as it is moved by a pick and place machine 48. The pick and place machine 48 picks up a ball grid array package having attached solder ball 12 and moves 50 the BGA. An encoder 49 associated with the pick and place machine 48 and processing module 30 triggers 51 the acquisition of data by detectors located on sensor 20 as the object is moved. It is an advantage of this invention that the pick and place machine does not have to stop the solder ball 12 in front of sensor 20 for data acquisition.

A further element of these embodiments is the use of a calibration technique to ensure the accuracy of the invention. An object with known step heights can be tested and the system can be calibrated by comparing the calculated heights to the known heights.

While the invention is drawn to detectors in a common plane, the detectors can also be offset to reduce the need for object motion. Additionally, a CCD area detector can be used instead of a series of linear arrays. The distinction being made here is more in the electronic configuration in the reading of the pixel values than in the physical size and shape of the pixel arrays.

It is apparent that there has been provided in accordance with the invention an optical measuring system that fully satisfies the objects, features and advantages set forth hereinabove. While the invention has been described in combination with embodiments thereof, it is evident that many alternatives, modification and variations will be apparent to those skilled in the art in light of the foregoing description. Accordingly, it is intended to embrace al such alternatives, modifications and variations as fall within the spirit and broad scope of the appended claims.

I claim:

1. A system for measuring the spatial dimensions of a three-dimensional object, comprising:
    a source of light for illuminating said object;
    a lens and a sensor, the combination thereof defining an optical axis, said sensor including at least a first photodetector and a second photodetector;
    said object to be measured being aligned with an object plane substantially normal to said optical axis;
    said first photodetector being spaced a first distance from said lens and said second photodetector being spaced a second distance from said lens wherein said first distance is greater than said second distance, such that said first photodetector images at best focus a point in the object plane at some distance from said lens and determined by the focal length of said lens, and such that said second photodetector images at best focus a point further in said object plane from said lens, again determined by the focal length of said lens;
    separate electrical outputs being generated by said first photodetector and by said second photodetector wherein intensities of said separate electrical outputs are proportional light collected from said object by said lens; and
    an electronic processing module effective to capture and store said separate electrical outputs from at least said first and second photodetectors to determine distance along said optical axis from said lens to a point on said object by contrast comparison of at least said first and second photodetectors.

2. The system of claim 1 wherein said object is capable of being scanned relative to said sensor whereby different areas of said object are within the view of said sensor.

3. The system of claim 2 wherein at least one of said object and said sensor is capable of motion relative to the other.

4. The system of claim 3 wherein said motion is orthogonal to said optical axis.

5. The system of claim 4 wherein said motion periodically triggers data acquisition by said at least first and second photodetectors whereby first said first photodetector and at a later time said second photodetector acquire data about a same point on said object.

6. The system of claim 2 wherein said sensor includes a plurality of photodetectors arranged in a rectangular array.

7. The system of claim 6 wherein said rectangular array of photodetectors form an array plane that is tilted at an angle with respect to said optical axis.

8. The system of claim 7 wherein a line formed by an intersection of said array plane and said image plane is generally orthogonal to a direction of scanning of said object to said sensor.

9. The system of claim 8 wherein said rectangular arrays of photodetectors is formed from a series of linear arrays of photodetectors wherein each said linear array of photodetectors is independently read into said electronic processing module according to said trigger signal.

10. The system of claim 7 wherein a non-photoactive space is disposed between said rectangular array of photodetectors.

11. The system of claim 7 further including an illuminated reticle aligned with a beam splitter to project a reticle pattern onto a surface of said object.

12. The system of claim 11 wherein said projected pattern is aligned to be in best focus when said surface of said object is in best focus.

13. The system of claim 2 wherein said electronic processor functions as a buffer to an electronic computer, said computer managing one or more of motion control, sensor image acquisition, triggering and image analysis.

14. The system of claim 13 wherein said buffer converts said electronic signal from said sensor to a gray-scale value that is subsequently converted to a height measurement.

15. The system of claim 13 wherein said buffer includes an algorithm effective to determine z-axis height position of points on said objects with respect to said nominal object plane by contrast comparison.

16. A computer system as described in claim 13 that compares the three-dimensional representation of said object for conformance of said object to a stored quality standard.

17. The system of claim 2 wherein said lens has a numerical aperture of at least about 0.1.

18. The system of claim 2 wherein said lens is telecentric.

* * * * *